United States Patent Office 2,986,647
Patented May 30, 1961

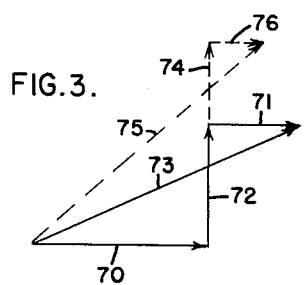
FIG.3.
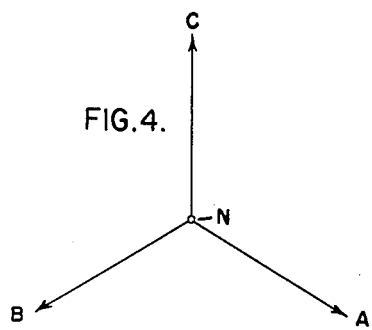
FIG.4.
FIG.5.
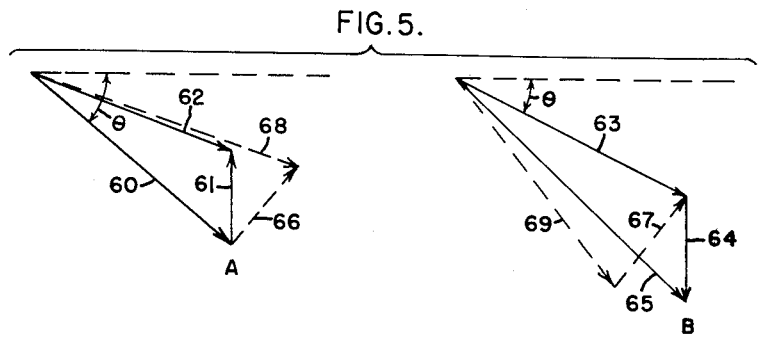
FIG.6.
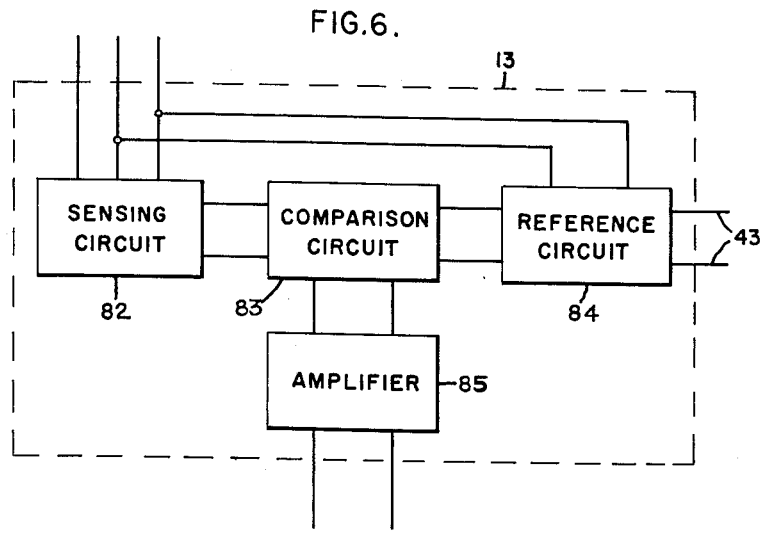
INVENTOR:
HAROLD H. BRITTEN,
BY Melvin M. Goldenberg
HIS ATTORNEY.

2,986,647
REGULATOR CONTROL APPARATUS FOR PLURAL GENERATORS

Harold H. Britten, Waynesboro, Va., assignor to General Electric Company, a corporation of New York Filed Apr. 1, 1959, Ser. No. 803,445

5 Claims. (Cl. 307—57)

This invention relates to improvements in automatic control systems for dynamoelectric machines. More specifically, it relates to a novel device for preventing instability in a system for parallel connected but independently driven polyphase alternating current synchronous generators.

The generation of alternating current electrical energy in many installations is accomplished by providing a plurality of alternating current machines connected in parallel with each other and supplying the system through buses interconnecting each of the output phases of the machines. Typically, the generators are independently driven through their own prime movers, which prime movers are automatically controlled by the use of elements responsive to change of the load on the system. In such systems, either through the intervention of an operator or as a consequence of the speed controlling regulator, the speed of the prime movers may change. In a specific situation where such parallel connected generators are provded on a vehicle such as a multiengine aircraft, the usual arrangement is to provide a generator driven from each engine of the aircraft through a suitable drive means. Typically, the drive means intermediate the engine and the generator is arranged to have a constant speed regardless of changes in engine speed. As a consequence of this, if there is a change in engine speed in a positive direction, that is, an increase, the speed of the generator will not change; however, the torque input to the generator will. In such a situation where the generator is delivering a fixed real load to the system and is running at constant field excitation, a positive torque impulse will cause the generator rotor to advance in space phase. That is to say, its power angle will increase. At the same time, since the generator is feeding into a system and its effect on the system is relatively small, the average generator speed will not change and the terminal voltage will remain constant. However, the real current will increase and there will be a resulting decrease in reactive current. The interrelationship of these effects is such that since the generator rotor is an inertial member upon the disturbance of its equilibrium by such a positive torque impulse, the rotor will or should seek its original position through a damped oscillation, the frequency of which is determined by the inertia and the restoring force.

While the above statements are generally true, an additional variable is introduced by the provision of reactive load division circuits in such systems. Inasmuch as it is necessary to provide that the parallel connected generators equally share the reactive load, a circuit is provided associated with each generator responsive to the reactive load developed by that generator and effective to modify or change the excitation of the generator in response to changes in reactive load. In the situation described in the immediately preceding paragraph, however, when the real current increases as a consequence of a change in torque from the drive, the reactive current will decrease when the generator has a constant field excitation. Under these circumstances, the reactive load division circuit should be effective to direct an increase in the excitation of the machine to thus help restore the power angle. However, the regulators now provided in such systems may have appreciable phase shifts at the frequencies at which this phenomenon is occurring and may actually act to decrease excitation during the interval of the positive torque impulse. Under these circumstances, the damping torque which should be effective to suppress the torque change induced oscillation would be in the negative direction, and the oscillation can be a very serious sustained or undamped oscillation.

In addition to the above described situation, it may generally be stated that where fast response regulators control polyphase synchronous alternating current generators paralleled with similar generators supplying a system and there is provided a reactive load division circuit sensitive to the reactive load being shared by a given generator, the occurrence of a transient condition either in the drive or in the excitation or load of the machine may cause an undamped oscillation to occur in the generator, thus resulting in an unstable system.

It is, therefore, an object of this invention to provide a novel reactive load division circuit for use in a system of paralleled polyphase alternating current generators which is effective to maintain an equal division of the reactive load among the generators supplying the system and is, at the same time, effective to assist in the minimizing of individual machine instabilities.

It is another object of this invention to provide a novel reactive load division circuit for use in a system of parallel connected generators which is effective to supply, under normal circumstances, control signals modifying the excitation of the generator to maintain an equal division of the reactive load amongst all of the generators supplying the system by exhibiting a sensitivity to the reactive load carried by each generator in the system and is, at the same time, sensitive to the real load carried by a generator in the system, and combines signals obtained as a consequence of such sensitivities in such a manner as not to support an unstable condition occasioned by a transient imposed on the system.

Briefly, in an embodiment of the invention I provide a reactive load division circuit provided with a first input sensitive to the reactive current supplied by a generator and a second input responsive to the real current supplied by the generator. The circuit further comprises means for effecting a vectorial addition of the input signals in such a manner that a sensitivity to both real and reactive currents is effected and a modifying voltage is supplied which may be utilized to control the excitation of the generator in the proper direction in all circumstances.

The features of my invention which I believe to be novel are set forth with particularity in the appended claims. The invention itself, however, both as to its structure and method of operation together with further objects and advantages thereof, may best be understood by reference to the following description taken in connection with the accompanying drawings wherein:

Figure 3 is a vector diagram illustrating the effects of a particular transient condition which may exist in systems such as illustrated in Figure 1;

Figure 4 is a vector diagram of voltages present in the output phases of the generators illustrated in Figure 1;

Figure 5 is a vector diagram of the signals supplied by a circuit embodying the invention; and Figure 6 is a schematic illustration in greater detail of means whereby the signal supplied by a circuit embodying the invention may be utilized to control the excitation of a generator such as shown in Figure 1.

Figure 1:
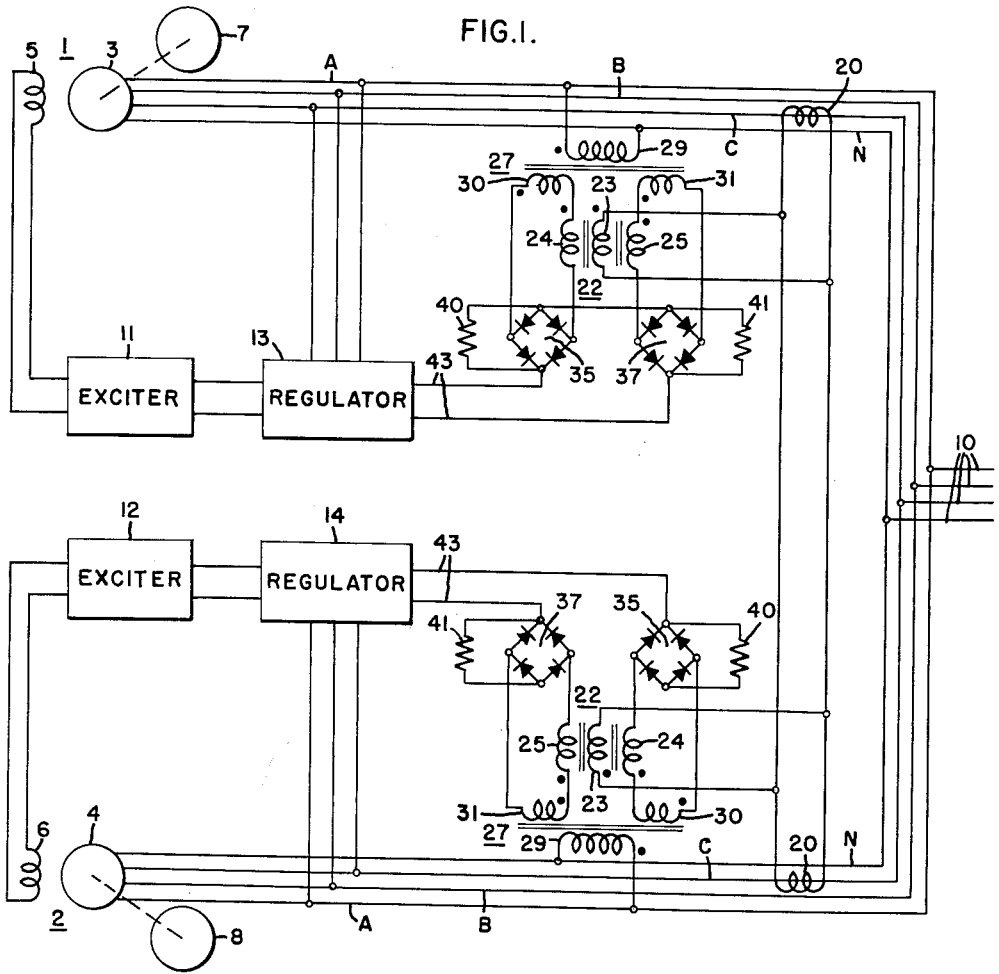
Figure 1 is a schematic illustration of an electrical generating system incorporating one embodiment of the invention.

Referring to Figure 1 of the drawing, the electrical generating system shown may be constituted in part by a pair of polyphase alternating current generators designated generally by reference numerals 1 and 2. Each generator is provided with an armature 3 and 4 respectively and exciting field windings 5 and 6 respectively. Associated with each of the generators 1 and 2 is a prime mover 7 and 8 which is effective to drive the generator through a suitable transmission system not shown in detail. In systems of the type illustrated, particularly when such systems are provided on vehicles such as aircraft, they are arranged to be of the four-wire variety. Thus, each generator is provided with output phases A, B and C and the neutral connection designated by the character N. The conductors A, B, C and N representing the three output phases of the generators 1 and 2 are connected together to system supply buses 10 usually by suitable connectors or circuit breakers (not shown) so that individual generators may be added to or removed from the system at the discretion of an operator or in the event of an emergency such as may be occasioned by over or undervoltages or fault conditions existing in the system or the generator.

A direct current voltage is supplied to the excitation fields 5 and 6 of each generator from exciters 11 and 12 respectively. The particular exciters utilized form no part of this invention and are illustrated only as block diagrams and may take the form of controlled power amplifiers of the rotating, static magnetic or vacuum tube type. The D.C. output of the exciters 11 and 12 is controlled by means of automatic regulators 13 and 14 respectively. In the system illustrated in the drawing, the regulators are arranged to develop a controlled D.C. voltage proportional to the output voltage of the generators and may be constituted by any of the well-known types.

In order that the reactive load in a system such as is illustrated in Figure 1 may be equally shared amongst the generators connected in parallel to the system, the invention contemplates the provision of a reactive load division circuit associated with each generator. The circuits associated with the machines 1 and 2 in the embodiment illustrated in Figure 1 are identical; consequently, their elements have been given the same reference numerals and only one will be described in detail. In accordance with the invention, the circuit is constituted by a current transformer 20 inductively coupled to one of the output phases of the generator. In the embodiment illustrated, this is shown as phase C. Connected to the current transformer is a transformer 22 having a primary winding 23 and a first secondary winding 24 and a second secondary winding 25. A second input to the reactive load division circuit is provided by a potential transformer 27 having one end connected to a different output phase of the generator, in this instance phase A, and the other end connected to the neutral connector or bus N. The transformer 27 is provided with a primary winding 29 and two secondary windings 30 and 31. As may be seen in the drawing, the secondary windings 30 and 24 are connected in series with each other and to the input terminals of a first rectifier 35, while the secondary windings 25 and 31 are series connected with each other and to the input terminals of a second rectifier 37. Connected across the output terminals of the rectifier 35 is a load resistor 40, while connected across the output terminals of the second rectifier 37 is a load resistor 41. The output terminals of the rectifiers 35 and 37 are connected to each other in such a manner that the voltages developed therein oppose each other on the conductors 43, which conductors may be connected to control the excitation of the generators 1 and 2 in a manner to be described in greater detail hereinafter.

The operation of the reactive load division circuit embodying the invention may best be understood by reference first to Figure 4. Figure 4 is a vector diagram of the voltages existing in the output phases A, B and C, which vectors in a typical three-phase system are 120° apart and have the instantaneous relative polarities shown with respect to the neutral bus designated N in Figure 1. Referring now to Figure 5, in the A figure thereof the voltage supplied to the rectifier 35 is the vector sum of the voltages produced on the secondary winding 30 of the transformer 27 and the secondary winding 24 of the transformer 22. The voltage appearing in the secondary winding 30 is the voltage between output phase A and neutral N and is represented by the vector 60. The voltage appearing in the secondary winding 24 is the voltage developed by the current in the current transformer 20 and at unity power factor is represented by the vector 61. As may be seen from an inspection of Figure 1, the windings 30 and 24 are related so that the voltages subtract from each other, therefore, yielding a resultant input to the rectifier 35 represented by the vector 62. In the B portion of Figure 5, the vector 63 represents the voltage on the transformer secondary 31, that is, the voltage again from phase A to neutral, while the vector 64 represents the voltage on the secondary winding 25. The polarity dots associated with these windings in Figure 1 indicate that these voltages are added to each other so that the voltage supplied to the rectifier 37 is represented by the sum of the vectors 63 and 64, that is, by the vector 65. The vectors 60 and 63 representing the real load on the generator, therefore, are proportional to the real current supplied by the generator. The vectors 61 and 64 represent the current supplied by the phase C of the generator and represent a condition wherein the generator is supplying a load at unity power factor. If the loading of the system should be such that real current is shared equally by all machines, the reactive current of one machine increases and, if it is assumed that it is the lagging reactive current which increases, the signal supplied by the transformer winding 24 will be represented by the vector 66 while the signal supplied by the transformer winding 25 is represented by the dotted line vector 67. Under these circumstances, the resultant vectors, that is, the voltage inputs to the rectifiers 35 and 37, will be represented by the dotted line vectors 68 and 69 respectively. Thus, the net voltage output of the rectifiers 35 and 37 will be effective to modify the excitation of the machine. Thus, the circuit is shown to be sensitive to the reactive current supplied by its associated generator. Further, since even under unity power factor conditions the output vectors 62 and 65 have different magnitudes and directions, the circuit is also shown to be sensitive to the real current. By providing that the output of the rectifiers 35 and 37 subtract from each other, the proportions of real and reactive current selected may be such that a zero output voltage is supplied from the reactive load division circuit to the regulating circuit under the conditions described.

The advantage of this arrangement may be understood from an inspection of the vector diagram illustrated in Figure 3 of the drawing. In this figure, the generator terminal voltage for a single phase is represented by the vector 70. As is well known, the voltage supplied to the generator field for excitation of the machine must be equal, therefore, to the sum of the generator voltage and the synchronous reactance voltage drops occurring in the machine. The synchronous reactance voltage drop caused by reactive current is represented by the vector 71, while the synchronous reactance drop caused by real current is represented by vector 72. When the vectors 70, 72, and 71 are added to each other, the field voltage which must be supplied is represented by the sum of the vectors or the vector 73. In the event of a transient disturbance on the system, such as where a momentary positive increase in torque is applied and where the field excitation voltage and the terminal voltage are constant, the resultant effect is to cause an increase in the real current supplied by the machine as represented by the dotted line vector 74. At the same time, if the field voltage vector 73 remains constant as represented by the dotted line vector 75, which merely represents a change in the phase angle of the machine, then the reactive current represented by vector 71 must decrease and, therefore, is equal to a value represented by the dotted line vector 76. As described above, in this situation the regulator should, in response to such a condition, act to increase excitation of the machine in order to restore the previously existing power angle; but, as pointed out, since the regulator is not an instantly responding device, there may exist appreciable phase shifts therein at the frequency at which such a transient disturbance can occur and it has been experienced that the regulator may actually act to decrease excitation under such conditions. Decreasing excitation has the effect of actually serving further to increase the power angle of the machine and may actually be considered a negative damping torque and very serious continuous oscillations may occur.

Therefore, with the circuit illustrated in Figure 1 by rendering the circuit which ordinarily would sustain such oscillations sensitive to real current as well as to reactive current in such a manner that upon an increase in real current the regulator will act to decrease excitation of the machine, oscillations due to such transient disturbances may be eliminated.

Figure 2:
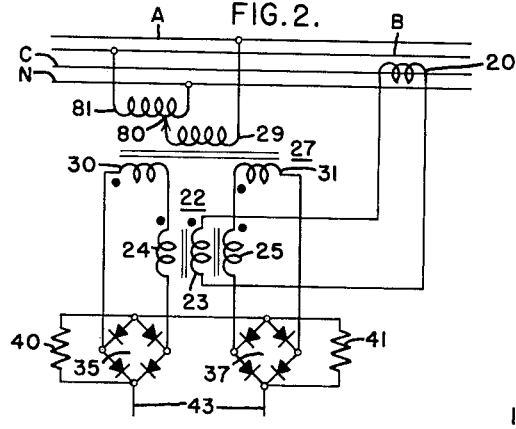
Figure 2 is a schematic illustration of an alternative embodiment of the invention.

In order that the circuit may be utilized in a wide variety of regulating systems having different time constants, it may be found desirable to provide a means whereby any proportion of the voltage between the selected output phase and neutral may be chosen. This depends on the magnitude of the signals derived from the current transformer 20 and the components utilized so that the objective would be to insure that upon the occurrence of a transient disturbance as described, the net output of the circuit will be effective to increase excitation. This may be accomplished by the embodiment illustrated in Figure 2. In this embodiment of the invention, those elements which correspond to previously described elements have been given the same reference numeral. Thus, it may be seen that the current transformer 20 supplied the transformer 22 while the potential transformer 27 is provided with the primary winding 29 and the secondary windings 30 and 31. In this embodiment of the invention, whereas one end of the primary winding 29 is still connected to the output phase A, the other end is connected to an adjustable tap 80 on an autotransformer 81 which is connected between the output phase B and the neutral N of the system. By proper adjustment of the tap 80, any portion of the output voltage between phase A and neutral in combination with the output voltage between phase B and neutral may be selected as required by the system parameters.

By virtue of this arrangement, the real current input to the reactive load division circuit may be selected. Thus, by movement of the tap 80 to extreme right-hand side of the transformer 81, the voltage selected will be that between phase A and the neutral N, and by movement to the extreme left-hand side the voltage selected will be that between phase A and phase B. Any intermediate position will result in a combination of these two voltages being supplied to the primary winding 29 of the transformer 27.

In order that the signal developed by the reactive load division circuits may be effective to modify the excitation of the generators 1 and 2, the arrangement illustrated in Figure 6 may be used. In this figure, the regulator 13 is illustrated as constituted by a sensing circuit 82 which may be any known in the prior art to derive a D.C. signal proportional to the generator output voltage. The D.C. signal so derived may be supplied to a comparison circuit 83 which receives as an additional input an adjustable D.C. reference signal from a reference circuit 84 and supplies a difference signal which varies in magnitude and polarity in accordance with the extent and direction of the variation of the machine output from the value fixed by the reference circuit 84. The difference may be amplified by any suitable amplifier 85 and supplied to the exciter 11.

While the invention has been described by reference to particular embodiments thereof, it will be understood that numerous modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. In an alternating current generating system including a plurality of polyphase synchronous generators connected in parallel and wherein each generator is provided with an excitation means and regulator means responsive to the machine output for controlling the excitation means, the improvement comprising a reactive load division circuit associated with each generator, each circuit comprising a potential transformer having a primary winding having a connection to one of the output phases of the generator and a neutral and a pair of secondary windings to derive a signal proportional to the real load on the generator, a current transformer coupled to another of the output phases of the generator to derive a signal proportional to the reactive load on the generator, means adding the signal induced in said current transformer to the signal induced in one of said potential transformer secondary windings in a cumulative manner and means for adding the signal induced in the current transformer to the signal induced in the other of said potential transformer secondary windings in an opposing manner, means for comparing the signals so added to derive a modifying signal proportional to both the real and the reactive loads on the generator and means responsive to the modifying signal to change the excitation of the generator.

2. In an alternating current generating system including a plurality of polyphase synchronous generators connected in parallel and wherein each generator is provided with an excitation means and regulator means responsive to the machine output for controlling the excitation means, the improvement comprising a reactive load division circuit associated with each generator, each circuit comprising a potential transformer having a primary winding having a connection to one of the output phases of the generator and a neutral and a pair of secondary windings to derive a signal proportional to the real load on the generator, a current transformer coupled to another of the output phases of the generator to derive a signal proportional to the reactive load on the generator, a transformer having a primary winding connected to said current transformer and first and second secondary windings, a first rectifier, means connecting one of said potential transformer secondary windings and said first transformer secondary winding in series opposing relationship to said first rectifier, a second rectifier, means connecting the other of said potential transformer secondary windings and said second transformer secondary winding in series cumulative relationship to said second rectifier, and means responsive to difference in the outputs of said rectifiers to modify the excitation of the generator.

3. A circuit as defined in claim 2 wherein said connection of said potential transformer is constituted by connecting one end of said potential transformer to said one of said output phases and the other thereof to said neutral.

4. A circuit as defined in claim 2 wherein said connection of said potential transformer is constituted by an autotransformer having one end connected to a third output phase and another end connected to said neutral and said potential transformer has one end connected to said one output phase and another adjustably connected to said autotransformer.

5. In an alternating current generating system including a plurality of polyphase synchronous generators connected in parallel and wherein each generator is provided with an excitation means and regulator means responsive to the machine output for controlling the excitation means, the improvement comprising a reactive load division circuit associated with each generator, each circuit comprising first and second input terminals, means for supplying to said first input terminals a first signal proportional at least in part to the real load on the generator, means for supplying to said second input terminals a second signal proportional at least in part to the reactive load on the generator, means for vectorially combining said second signal with said first signal in a cumulative manner, means for vectorially combining said second signal with said first signal in an opposing manner, and means for comparing the signals so combined to derive a signal proportional to both the real and reactive loads on the generator.

References Cited in the file of this patent
UNITED STATES PATENTS

| | | |
|---|---|---|
| 2,286,102 | Peters et al. | June 9, 1942 |
| 2,829,278 | Flugstad | Apr. 1, 1958 |
| 2,843,760 | Kahle | July 15, 1958 |
| 2,872,591 | Stineman | Feb. 3, 1959 |